United States Patent [19]

Ferrin et al.

[11] Patent Number: 5,576,887
[45] Date of Patent: Nov. 19, 1996

[54] HEAD GEAR DISPLAY SYSTEM USING OFF-AXIS IMAGE SOURCES

[75] Inventors: Frank J. Ferrin, Plymouth; Justin G. Droessler, Fridley, both of Minn.

[73] Assignee: Honeywell Inc., Minneapolis, Minn.

[21] Appl. No.: 493,780

[22] Filed: Jun. 22, 1995

[51] Int. Cl.$^6$ .................. G02B 27/14; G09G 5/00
[52] U.S. Cl. .................. 359/631; 359/630; 345/7; 345/8
[58] Field of Search .................. 359/630, 631, 359/633, 634; 345/7, 8, 9

[56] References Cited

U.S. PATENT DOCUMENTS

| | | | |
|---|---|---|---|
| 3,059,519 | 10/1962 | Stanton | 88/1 |
| 3,787,109 | 1/1974 | Vizenor | 359/631 |
| 4,026,641 | 5/1977 | Bosserman et al. | 359/869 |
| 4,081,209 | 3/1978 | Heller et al. | 359/631 |
| 4,153,913 | 5/1979 | Swift | 358/93 |
| 4,361,384 | 11/1982 | Bosserman | 359/630 |
| 4,465,347 | 8/1984 | Task et al. | 359/460 |
| 4,755,023 | 7/1988 | Evans et al. | 345/8 |
| 4,950,567 | 8/1990 | Keys et al. | 430/1 |
| 4,968,117 | 11/1990 | Chern et al. | 359/573 |
| 5,035,474 | 7/1991 | Moss et al. | 359/13 |
| 5,151,722 | 9/1992 | Massof et al. | 351/158 |
| 5,184,250 | 2/1993 | Lacroix | 359/631 |
| 5,303,085 | 4/1994 | Rallison | 359/630 |
| 5,341,242 | 8/1994 | Gilboa et al. | 359/631 |
| 5,416,876 | 5/1995 | Ansley | 359/630 |
| 5,436,765 | 7/1995 | Togino | 359/631 |

Primary Examiner—Georgia Y. Epps
Assistant Examiner—Ricky Mack
Attorney, Agent, or Firm—Charles J. Ungemach

[57] ABSTRACT

A head gear display system incorporates a simple off-axis optical projection system employing a pair of lenses and an optical combiner for collimating a visual image onto an observer's eye.

8 Claims, 4 Drawing Sheets

HEAD GEAR DISPLAY SYSTEM USING OFF-AXIS IMAGE SOURCES

BACKGROUND OF THE INVENTION

1. Field of the Invention

The present invention relates in general to head gear display systems which provide visual information to the wearer of the head gear display system simultaneously with an external scene in the eye of the wearer's field of view.

2. Description of the Related Art

Head gear display systems, sometimes referred to as "helmet display systems", "head mounted displays", and "head-up display systems", and the like, are those which generally allow for the simultaneous viewing of visual information and/or images generated by a computer or other source, together with, and/or superimposed on, a direct viewing of an external scene are well-known.

Such head gear display systems find utility in many areas, such as training, machine control, or entertainment. Such systems have found particular utility in military applications where information must be supplied to vehicle operators and weapons controllers. Aircraft pilots find such systems useful to furnish information relating to aircraft operation, weather radar presentations, maps, weapons aiming, and other such information as would be useful or desirable in their flight mission.

In some systems, the visual information or visual images are superimposed on an optical combiner mounted on the head gear, sometimes a helmet visor, in view of the eye of the wearer, i.e., the observer's line of sight. These visual images may be derived from a variety of display sources including cathode ray tubes, fiber optic displays, flat screen liquid crystal or electroluminescent devices, some including image enhancers, and even photographic projectors operating with an appropriate optical relay system, all of which may supply the observer with visual information.

Helmet mounted systems for displaying images are well-known in the art. U.S. Pat. No. 3,059,519, issued to Stanton, taught a helmet mounted display in which a CRT display was directed through an optical system that included a plurality of reflecting mirrors which ultimately placed the image in the eyes of the observer slightly above the normal line of sight.

U.S. Pat. No. 3,787,109, issued to Vizenor, disclosed a display where a helmet was provided with a pair of paraboloidal visors, serving as an optical see-through combiner or mirror, with a partially reflective coating on the inner surface as the primary optical element in reflecting the display source image from the visor to the eye of the observer.

U.S. Pat. No. 4,465,347, issued to Task et al., discloses a system in which the image is derived from a telescopic optical system which projects the image on an inner surface of the visor. The visual image is reflected to a planar mirror on the helmet and to the visor again where it is directed into the eye of the viewer and it appears to be part of an external scene.

A substantially more complex helmet display is disclosed in U.S. Pat. No. 4,361,384, issued to Bosserman. Disclosed is a device which combines a thin film flat panel display and a wafer diode image intensifier tube. A plurality of semi-transparent optical systems direct the visual image from the flat panel display into the eye of the observer. The image intensifier, using some of the same optics, also directs a visual image into the eye where it can be super-imposed over the images received from the external scene as observed through the visor. The observer thus views the exterior through both the visor and the flat panel display images. The visor, for reflecting purposes, may be holographic, toric, aspherical, or spherical.

U.S. Pat. No. 4,026,641, issued to Bosserman et al, discloses a head gear display system including a fiber optic bundle having a toric convex object surface which serves as an optical transfer device to transfer visual information from the auxiliary display to the toric convex object surface. In turn the visual image is directed towards a toric optical combiner which serves to direct the visual image toward the eye of the wearer of the head gear display system.

For the most part, prior art head gear display systems employ generally an on-axis optical system (i.e. symmetrically arranged around the central optical axis, sometimes folded), including optical elements internally employed for a projection system for projecting the visual image onto a head gear visor which serves as an optical combiner. However, U.S. Pat. No. 4,968,117 describes employment of an aspheric combiner with a complex projection system, including prisms and a series of optical elements, whose optical axis is off-axis relative to the exit images from a prism face. The optical system disclosed illustrates an optical relay system and following scheme for collimating the visual image toward the eye of the wearer of the head gear display system.

A problem with each of the prior art head gear display systems presently available has been their size and bulk. This is primarily due to the optical systems chosen to achieve the intended function. A second problem with systems of the prior art is their shortfall in providing greater eye relief.

SUMMARY OF THE INVENTION

An object of the present invention is to provide a head gear display system which provides greater eye relief than prior art systems.

It is an object of the present invention to provide a head gear display system having an optical efficiency so as to lower the display source power requirements and lower overall head gear display system weight.

In accordance with the present invention, there is provided a head gear display system for simultaneously superimposing visual information and an external scene in the observer's field of view. The head gear display system is intended to be attached to head gear which is, adapted to be mounted on an observer's head. The head gear display system includes a display source for generating a visual image to display visual information. The display system in accordance with the present invention further comprises a pair of lenses and an optical combiner configured for collimating the visual image toward the eye of the wearer of the head gear display system.

DESCRIPTION OF THE PREFERRED EMBODIMENT

Figure 1:
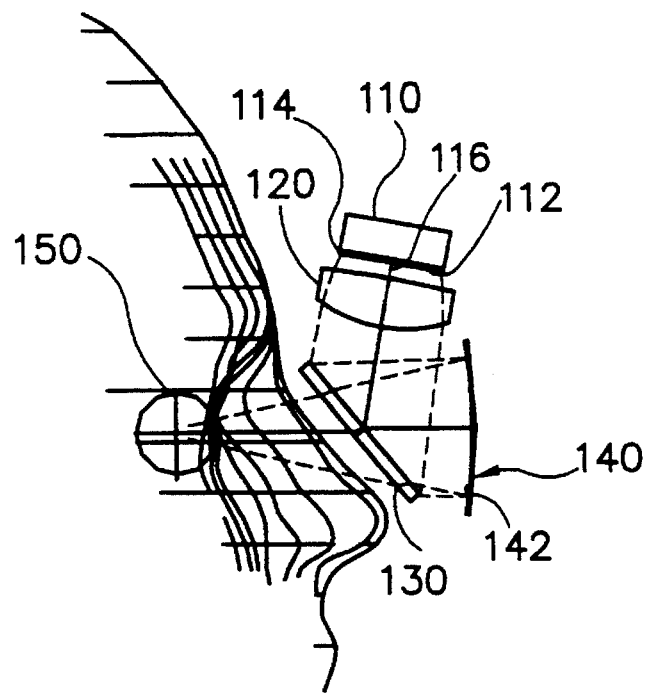
FIG. 1 illustrates a prior art head gear display system showing the relative positions of a display source, an optical projection system, and wearer's eye position.

FIG. 1 illustrates an on-axis optical configuration known in the art and similar to, but not exactly like, that described in U.S. Pat. No. 5,303,085, issued to Rallison. The head gear display system generally comprises a display source 110, an optical projection system including lens 120 and beam splitter 130, serving to project visual information onto optical combiner means 140, serving as a see-through combiner and also possibly serving as the helmet visor for viewing an external scene. The aforesaid constituent components of the head gear display system of the prior art are generally mounted to head gear (not shown). All of the optical components as illustrated in FIG. 1 of the prior art are on-axis optical elements. That is, they are symmetrically arranged around the central or optical axis of the optical components, shown folded as illustrated.

The head gear display system as illustrated in FIG. 1 operates in the following manner. The display source 110, for example, a miniature flat panel display source, includes an image surface 112, defining an image plane 114 having a central image reference axis 116 perpendicular to image plane 114.

Light rays from the visual image emanating from the image plane 114 pass first through lens 120, normally employed as a field flattner. In turn, light rays travel to a partially reflecting beam splitter 130 where they are reflected toward partially reflecting surface 142 of optical combiner 140. In turn, these rays are reflected off the partially reflecting surface 142 back toward beam splitter 130, and passing therethrough toward the observer's eye 150, i.e., the wearer of the head gear display system.

For proper functioning of the head gear display system illustrated in FIG. 1, the optical coatings of beam splitter 130 and combiner 140, employed in this on-axis mechanization, are likely to be constructed in accordance with one of two possible schemes. First, one approach is to use neutral density coatings with 50% reflection (and therefore 50% transmission) for both beam splitters 130 and combiner 140. The other approach is to use narrow spectral band coatings with high reflection coefficient within a spectral band (centered on the spectral output of the display source if it is monochrome, or multiple spectral bands if it is a color display). In either case, a loss of light transmission efficiency results from the multiple rays bouncing off each of the beam splitters and combiner surfaces. For example, when using neutral density coatings, the light transmission due to the three reflecting surfaces, namely, beam splitter-combiner-beam splitter, is approximately $$0.5 \times 0.5 \times 0.5 = 0.125$$

assuming that loss through lens 120 is small.

In a case where narrow spectral filter coatings are used, the transmission loss is not as great, but is still significant, and the color shift of the external scene as viewed by the observer may be objectionable. However, it too contains three reflections in the complete light path (i.e. two reflections off the beam splitter and one reflection off the see-through combiner).

Figure 2:
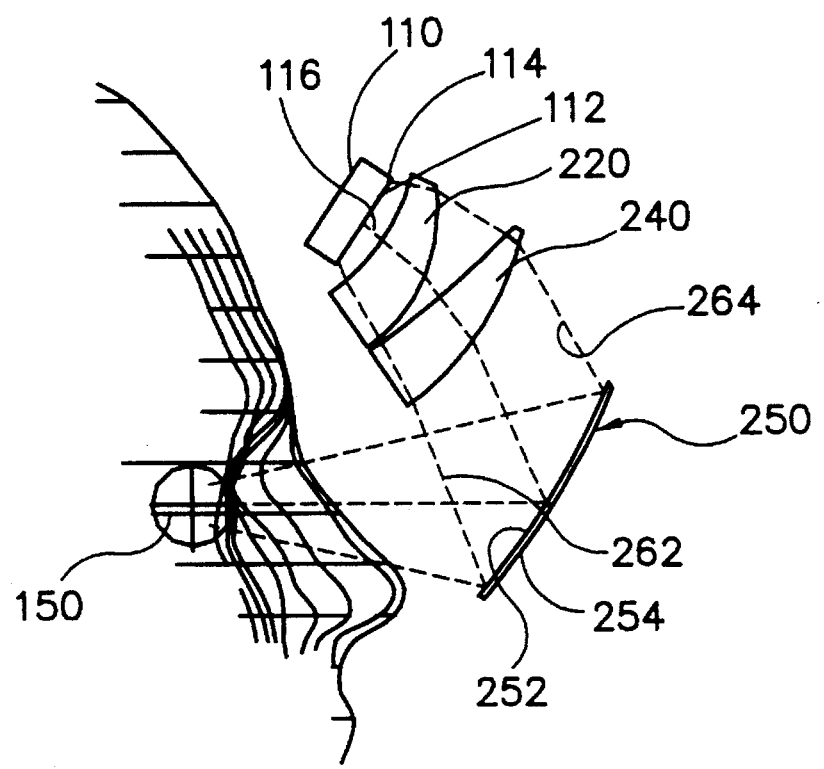
FIG. 2 is a head gear display system in accordance with the present invention.

FIG. 2 illustrates a head gear display system employing an off-axis optical configuration in accordance with the present invention. Like FIG. 1, thereshown is a display source 110 providing an image surface 112 defining an image plane 114 and central image reference axis 116.

An optical projection system is provided by way of spherical lenses 220 and 240 for projecting the visual image onto an optical see-through or partially reflective optical combiner 250 through which the observer may view an external scene and simultaneously view the projected visual image provided by the display source. Optical combiner 250 includes an observer's surface side 252 being generally 50% reflective, and an external scene surface side 254, opposite side 252, generally having anti-reflective coating thereon.

Figure 3:
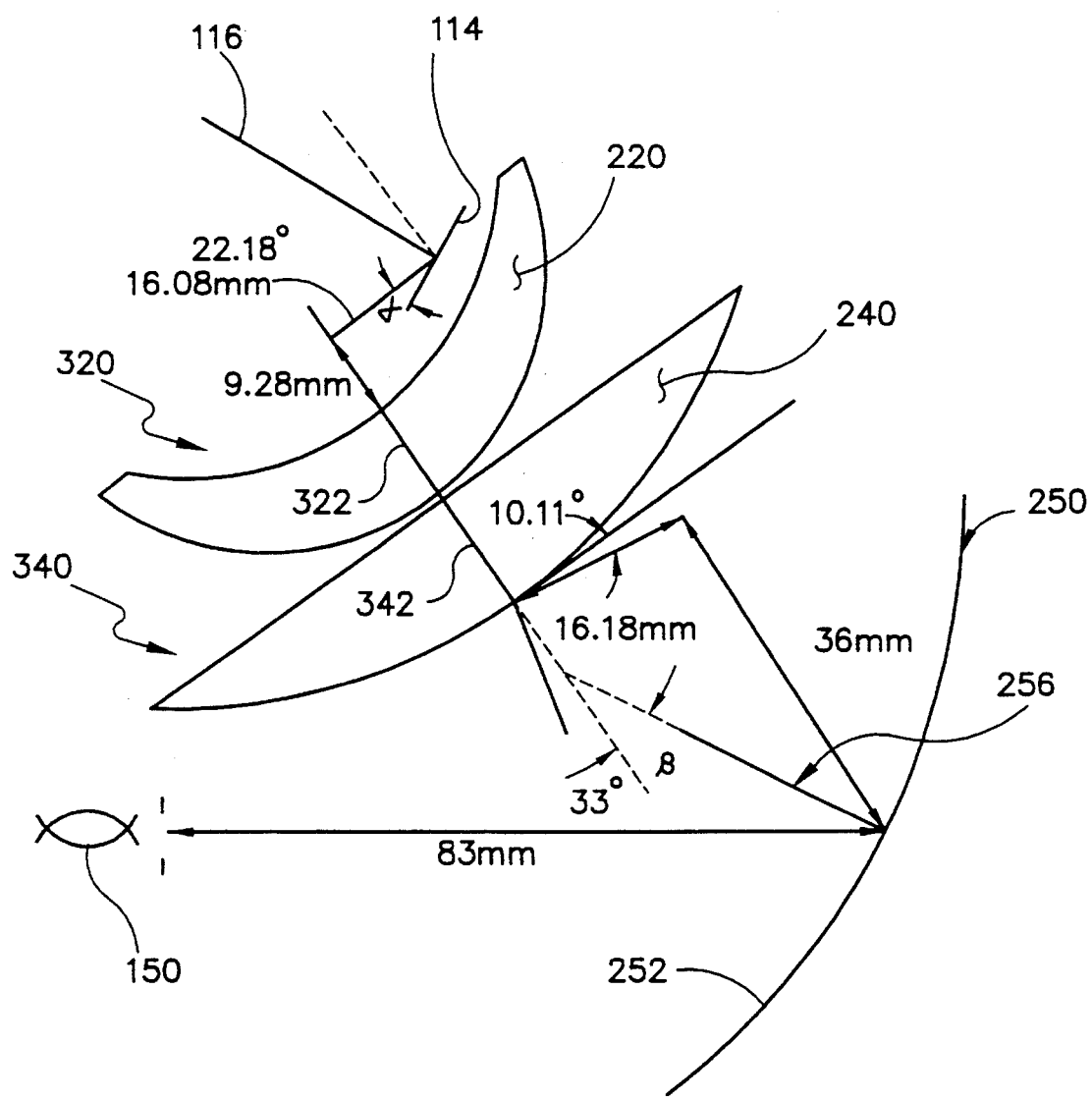
FIG. 3 is a diagram illustrating the relationship of the optical components employed in the head gear display system in accordance with the present invention.

The projection system of the preferred embodiment of the present invention employs only the eccentric portions of lenses 220 and 240 illustrated in FIG. 2. This is particularly illustrated in the diagram of FIG. 3 which illustrates a side view of complete symmetric spherical lenses 320 and 340 from which the core lenses 220 and 240 would be cut, respectively. FIG. 3 further illustrates the optical relationships between the optical components employed in accordance with the present invention.

Referring now to FIG. 3, again shown is the image plane 114 of the display source and the central image reference axis 116. The central lens axis 322 of spherical lens 320 is aligned with the central lens axis 342 of spherical lens 340. Lenses 320 and 340 are oriented such that their respective central lens axes are both decentered and tilted by the angle α relative to the central image reference axis 116. Further, the central axis 256 of the optical combiner 250 is decentered and tilted by an angle p relative to the central lens axes of lenses 320 and 340.

Figure 4:
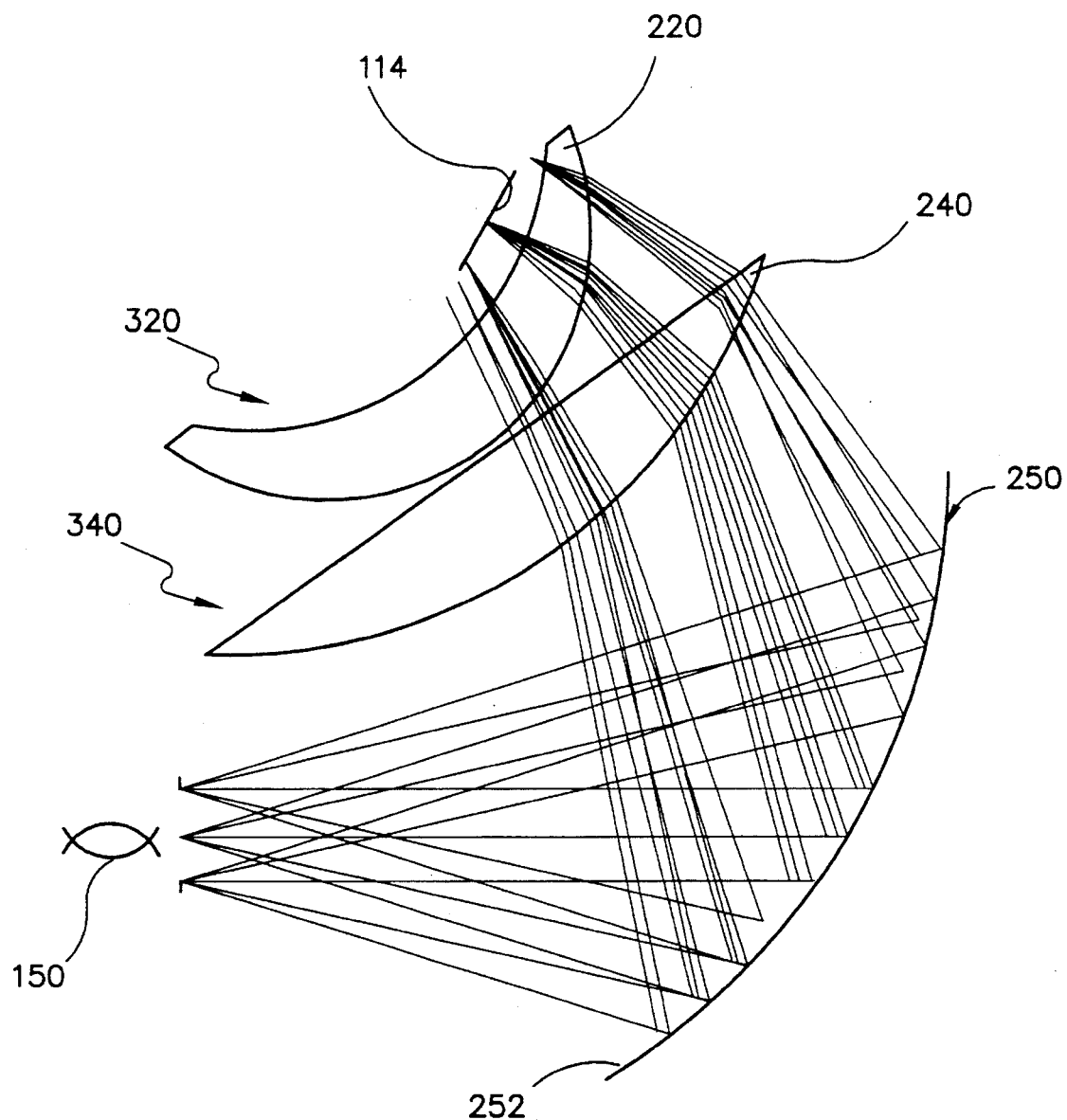
FIG. 4 is a diagram illustrating the optical rays of the visual image from source to the eye resulting from employment of the optical components illustrated in FIGS. 2 and 3.

FIG. 4 illustrates the optical rays projecting from the image plane 114 successively through core cut lenses 220 and 240, and reflected from the observer's surface side 252 of optical combiner 250 toward the observer's eye 150. As illustrated, the simple optical system comprised of a pair of lenses and an optical combiner in accordance with the present invention provides a collimating optical system for producing a virtual image at the observer's eye.

In the preferred embodiment of the invention, combiner 250 is configured preferably as an aspherically shaped toroid, and lenses 220 and 240 which are spherically shaped. As is well known to those skilled in the are, the radii of curvature, thickness, aspheric and spheric coefficients, the chosen optical material, and the relative spacing therebetween, of these optical components must be so selected and arranged to achieve the intended collimation of the virtual image onto the observer's eye. Therefore, the dimensions and orientation of the optical components illustrated in FIG. 3 are only exemplary, and other combinations are, of course, possible as known to those skilled in the art.

It should be understood by those skilled in the art that the simple optical system illustrated in the Figures may be varied within the level of skill in the art, all of which are intended to be in within the true spirit and scope of the present invention. More particularly, the core cuts of lenses 220 and 240 from lenses 320 and 340, respectively, may be either spheric or aspheric, and similarly, toric optical combiner 250 may also be spheric or aspheric, without departing from true spirit and scope of the present invention.

As should be understood by those skilled in the art, the configuration as illustrated in FIG. 2 employs only one reflecting surface between the wearer's eye and the external scene (external scene being seen through the see-through combiner 250). Thus, in the present invention, optical power of the display source visual image is only reduced by 50% due to the optical combiner 250 beam splitter function achieved by the see-through combiner 250. In comparison with the prior art, employment of the present invention improves light efficiency by as high as a factor of four. This implies that the power required by the display source 110 may be reduced by 75% of that used in the prior art using on-axis optical mechanizations. This is of paramount importance for head gear display systems since if power dissipation is reduced, then the weight needed for heat sink structure is reduced, both of which are of particular importance for battery operated portable systems.

A second advantage of the present invention is that it provides additional eye relief compared to the prior art shown in FIG. 1. This is so, since eye relief, of course, is defined as the distance between the user's eye and the closest optical elements of the head gear display system. This is of particular importance for those that wear eye glasses to have as much eye relief as is practical. In a comparison between the prior art of FIG. 1 and that of FIG. 2, there is greater eye relief in the present invention as compared to the prior art because the optical mechanization of the prior art requires the beam splitter between the eye and the see-through combiner. Whereas in the present invention, the optical combiner is in an unobstructed view of the observer's eye thereby enhancing eye relief.

Figure 5:
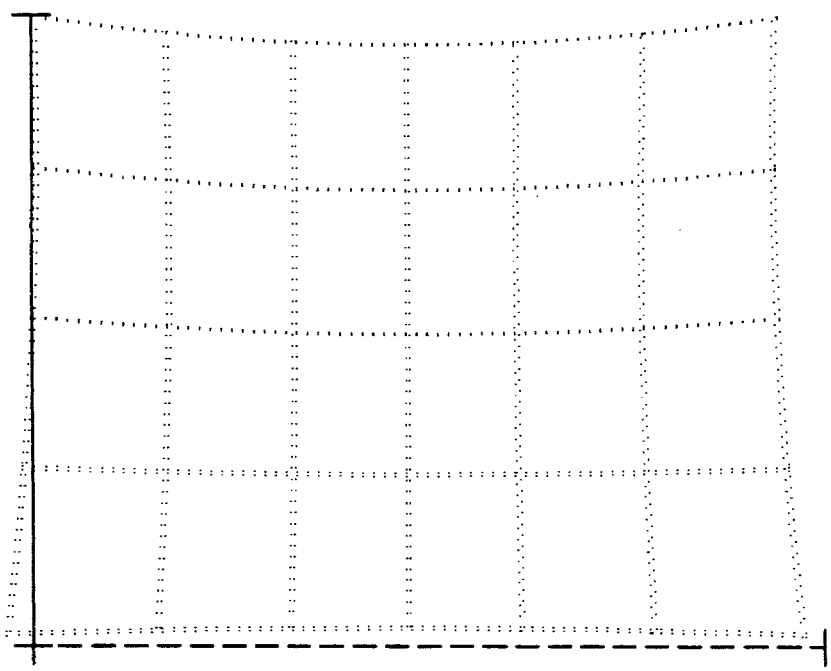
FIG. 5 is an illustration generally depicting an observed visual image resulting from the head gear display system in accordance with the present invention.
Figure 6:
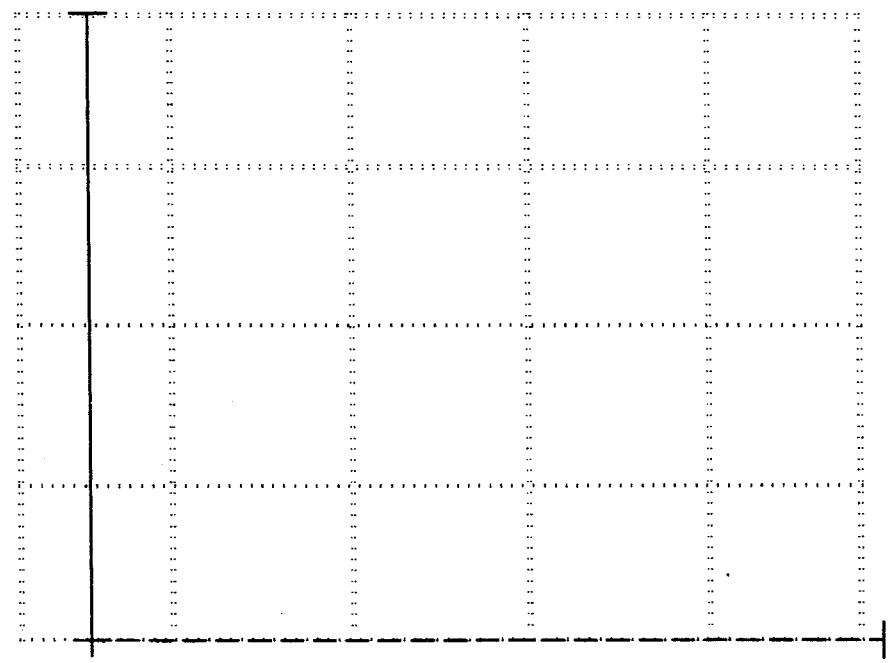
FIG. 6 is an illustration generally depicting an observed visual image resulting from an on-axis head gear display system of the prior art.

Employment of the off-axis optical mechanization in accordance with the present invention may generally result in an optically distorted image as particularly illustrated in FIG. 5 as compared to the optical distortion of a prior art on-axis mechanization as illustrated in FIG. 6. However, the off-axis distortion resulting from employment of the optical mechanization in accordance with the present invention may be corrected by way of at least two techniques.

First, the distortion may be corrected electronically in the display drive electronics by computing the location of the imagery or symbology in accordance with the predicted distortion pattern similar to that shown in FIG. 5 (i.e. predistorting the visual image so that the off-axis mechanization results in being less distorted). Accordingly, when the predistorted visual image generated by the display source has been projected by the optical elements as illustrated, the observer may see the desired non-distorted imagery and/or symbology.

A second scheme for distortion correction is to physically alter the image plane of the display means such that after the visual image is projected through the off-axis optical elements, the observer sees generally a normal distortionless visual image.

As already indicated, details of lenses 220 and 240, as well as the radii of curvature of the aspheric toroid 250, employed as the see-through optical combiner 250, are substantially dependent upon there spatial relationships, and particularly the see-through combiner 250 namely, the distance between the observer's eye 150 and the combiner 250 as attached to a particular head gear or helmet. In turn, the radius of curvature of the optical lenses 220 and 240 are equally affected by the configuration, and therefore details thereof have not been described herein and are well understood in the art. However, it should be noted that the radii curvature of the see-through optical combiner 250 is selected such that the display appears to be located at infinity as viewed by the observer.

The embodiments of an invention in which an exclusive property or right is claimed are defined as follows:

1. A head gear display system, intended to be mounted to head gear, for projecting visual information toward the eye of the wearer of said head gear display system, the head gear display system comprising:

a toricly shaped reflective surface spatially located between the eye of the wearer of the head gear display system and an external scene, said toricly shaped reflective surface having a central optical axis associated therewith;

display source means for generating a visual image to provide visual information at a display surface, and where associated with said display surface is an image plane and a central image reference axis perpendicular to said image plane;

first and second lenses spatially positioned such that said visual image passes successively through said first and second lenses and impinges on said toricly shaped reflective surface, said first and second lenses each having a central axis associated therewith and arranged such that said central axis of said first lens is aligned with said central lens axis of said second lens, and said central axis of said first and second lenses are tilted and decentered relative to said central image reference axis; and said toricly shaped reflective surface is partially reflective and partially transmissive, and is spatially oriented such that said central axis associated therewith is tilted and decentered relative to said central axes of said first and second lenses, and said toricly shaped reflective surface is configured to reflect, at least in part, said impinging visual image, thereon, toward the eye of the wearer of said head gear display system.

2. The head gear display system of claim 1 wherein said first and second lenses are spherical lenses.

3. The head gear display system of claim 1 wherein said display source means is a flat panel display.

4. The head gear display system of claim 3 wherein said flat panel display provides a visual image which is intentionally distorted, so as to diminish any optical image distortion, as observed by the wearer's eye, resulting from said visual image passing through said first and second lenses and reflecting from said toricly shaped reflective surface.

5. The head gear display system of claim 1 wherein said toricly shaped reflective surface permits said eye of the wearer to simultaneously view said visual image and said external scene.

6. The head gear head gear display system of claim 1 wherein said toricly shaped reflective surface is located in an unobstructed view of said eye of the wearer.

7. The head gear head gear display system of claim 1 wherein said first and second lenses in combination with said toricly shaped reflective surface collimates said visual image toward said eye of the wearer.

8. The head gear display system of claim 1 wherein said toricly shaped reflective surface is substantially the shape of an aspherical toroid.

* * * * *